Patented Feb. 8, 1938

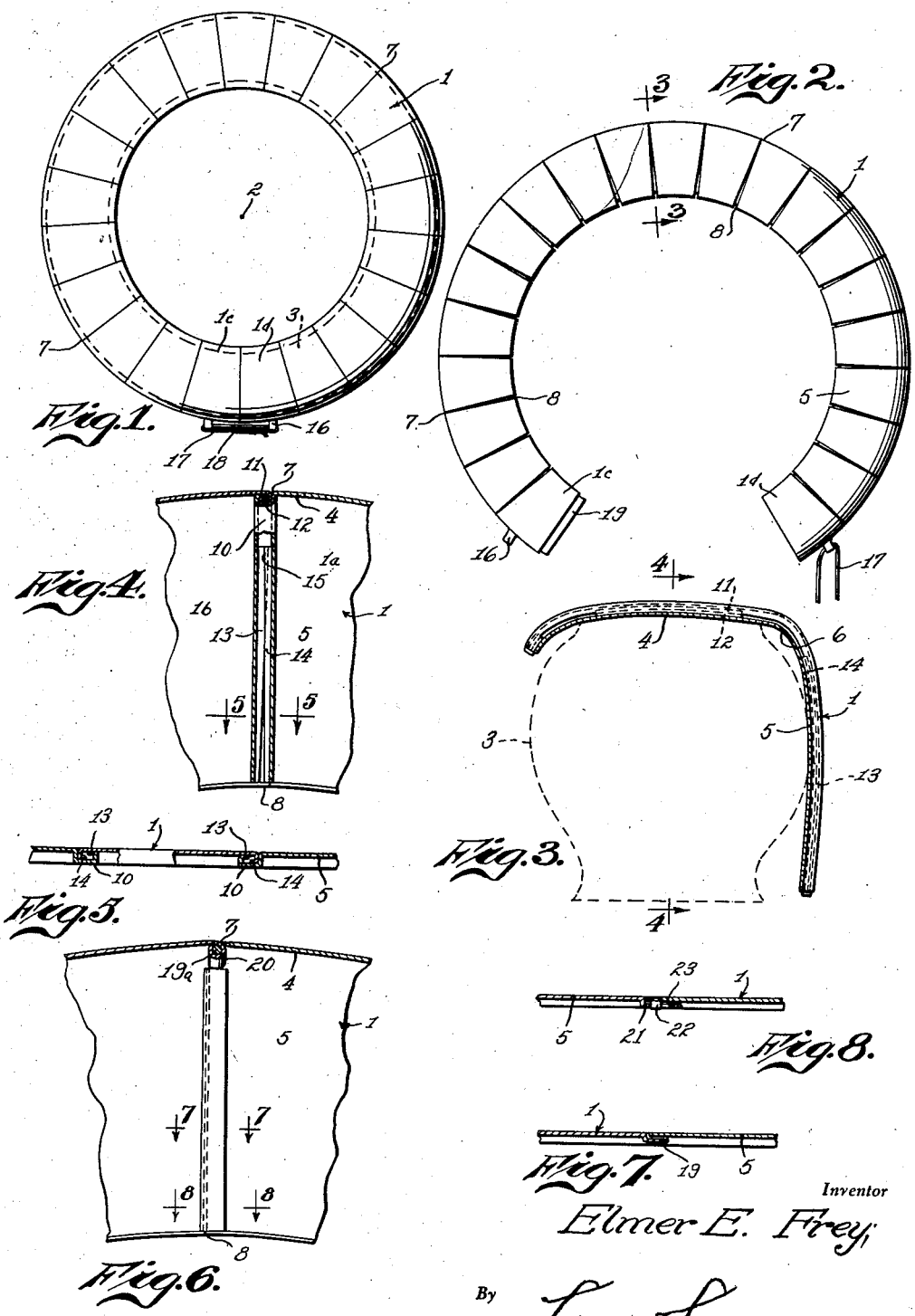

2,107,783

UNITED STATES PATENT OFFICE 2,107,783

TIRE COVER

Elmer E. Frey, Los Angeles, Calif., assignor to Kittle Manufacturing Co., Los Angeles, Calif., a corporation of California Application January 27, 1931, Serial No. 511,531

7 Claims. (Cl. 150—54)

This invention relates to a tire cover, such as applied on automobiles for covering a spare tire. Such covers have been heretofore constructed generally of light rubberized fabric, which becomes worn from use and may be torn in removing the same or applying it to the spare tire. It has been attempted to form such covers of metal, but usually such metal covers cannot be very readily applied and removed from the tire.

The general object of this invention is to produce a tire cover of simple construction which can be readily applied and removed from the tire and which will be of a more durable character than the non-metal tire covers heretofore employed.

A further object of the invention is to provide a tire cover composed of a plurality of connected segments which are attached in such a way that they have a limited amount of movement enabling the cover to assume a sufficiently large diameter to enable the same to be readily applied over the tire.

A further object of the invention is to produce a durable tire cover of simple construction which will be neat and attractive in appearance and which can be readily applied or removed from the spare tire.

Further objects of the invention will appear hereinafter.

The invention consists in the novel parts and combinations of parts to be described hereinafter, all of which contribute to produce an efficient tire cover.

A preferred embodiment of the invention is described in the following specification, while the broad scope of the invention is pointed out in the appended claims.

In the drawing:—

Figure 1 is a side elevation of a tire cover embodying my invention and representing the same in its closed position, that is to say, with the parts in the relation which they have when the cover has been applied to a tire.

Fig. 2 is a view similar to Fig. 1, but representing the tire cover in its open position ready to be applied over a tire.

Fig. 3 is a section upon an enlarged scale, taken substantially on the line 3—3 of Fig. 2 and indicating the tire in dotted outlines.

Fig. 4 is a section taken about on the line 4—4 of Fig. 3 and further illustrating an embodiment of the invention in which the segments of the cover are interlocked with each other through the medium of integral hooked flanges.

Fig. 5 is a section taken at about the location of the line 5—5 of Fig. 4, but passing in a circumferential direction and illustrating one of the segments, and also illustrating how it interlocks at its edges with the adjacent segments.

Fig. 6 is a view similar to Fig. 4, but showing a construction embodying a regular hinged connection between the adjacent segments.

Fig. 7 is a section taken on the line 7—7 of Fig. 6 and further illustrating details of this embodiment of the invention.

Fig. 8 is a section taken at about the point 8—8 of Fig. 6 and illustrating a construction which may be employed, if desired, to limit the opening movement of the segments.

Referring more particularly to the parts, and especially to Figs. 1 and 2, the tire cover is preferably of annular form, as illustrated, being composed of a plurality of segments, indicated generally by the numeral 1. These segments are of tapered form, as shown, so that their adjacent edges lie substantially in radial planes from a central point 2 which corresponds to the center point of the tire 3 to which the cover is applied. As indicated in Fig. 3, each segment is of substantially angular form, that is to say, it presents an outer plate 4 which is adapted to lie against the thread of the tire, and an inner plate or side plate 5 lies against the side face of the tire. These plates 4 and 5 are united at an angle 6, at which point the metal forming the segment is bent to a slight curve or radius.

According to my invention, I unite the segments together by means of joints located at the points 7 all around the cover (see Fig. 2), and the connection between the segments is such as to permit a slight relative circumferential movement at the points 8 at the inner edges of the segments. This may be accomplished in different ways, as will now be described.

In the embodiment of the invention illustrated in Figs. 4 and 5 the joint 7 is formed by means of flanges on the segments which are constructed so that they interlock with each other. In other words, as illustrated in Fig. 4, the segment 1ª located at the right is formed with an inwardly offset flange 10, which terminates in an outward extension or hook 11, the opposite segment 1ᵇ being provided with an inwardly projecting hooked flange 12 which is hooked into the hook 11.

On the side portions 5 of these segments similar hooked flanges 13 and 14 are provided (see Fig. 5), and these flanges at their outer ends, as at 15, are constructed like the flanges 11 and 12, but toward the point 8 the hooks of these flanges are of reduced width thereby forming a clearance in the hooked joint which permits a relative circumferential movement of the segments at the points 8. This enables the tire cover to be opened up, as indicated in Fig. 2, to enlarge the diameter and enable it to pass readily over the spare tire.

The two end segments 1ᶜ and 1ᵈ are provided with any suitable means for drawing the ends of the cover together after it has been applied. For this purpose, I may provide these two segments with eyes 16 to carry a strap 17 having the buckle 18 (see Fig. 1) to enable it to be pulled up tight.

One of the segments, for example the segment 1c, may be provided with a plain offset flange 19 to telescope inside of the adjacent edge of the segment 1d. This construction would be substantially the same as that indicated in Fig. 7.

In Fig. 6 I illustrate another embodiment of the invention in which the joint at the point 7 is formed as a regular hinge involving the use of a short hinge pin 19a that unites the adjacent segments of the cover through the agency of integral sleeves 20 formed on the plates in the usual manner of forming a hinged connection.

If desired, means may be provided for limiting the relative circumferential movement of the segments, and suitable means for this purpose is illustrated in Fig. 8. This means consists in providing an inner offset flange 21 on one of the segments and providing the opposite segment with a pin 22 that runs in a short slot 23 formed in the flange 21 in a general circumferential direction with respect to the central point 2 of the cover.

It is understood that the embodiment of the invention described herein is only one of the many embodiments this invention may take, and I do not wish to be limited in the practice of the invention, nor in the claims, to the particular embodiment set forth.

What I claim is:—

1. A tire cover having a plurality of relatively short segments disposed substantially throughout the entire circumferential length of the cover with their adjacent edges located in planes radiating from an interior point, said segments having means for connecting the same at their adjacent edges operating to permit relative circumferential movement of the segments at their inner edges, said means having a pivotal action adjacent the exterior circumference of the cover whereby said cover may assume an enlarged diameter when opened and removed from the tire.

2. A tire cover having a plurality of relatively short segments disposed substantially throughout the entire circumferential length of the cover with their adjacent edges located in planes radiating from an interior point, said segments having interlocking flanges for connecting the same at their adjacent edges operating to permit relative circumferential movement of the segments at their inner edges about a point or points adjacent the exterior circumference of the cover, whereby said cover may assume an enlarged diameter when opened and removed from the tire, said flanges adjacent the radially inner edge of the cover having means for limiting the circumferential movements of the segments.

3. A tire cover having a plurality of relatively short segments disposed substantially throughout the entire circumferential length of the cover with their adjacent edges located in planes radiating from a substantially interior point, said segments being so connected at their adjacent edges as to permit relative circumferential movement of the segments at their inner edges about a point or points adjacent the exterior circumference of the cover whereby said cover may assume an enlarged diameter when opened and subsequently removed from the tire.

4. A tire cover having a plurality of relatively short segments disposed substantially throughout the entire circumferential length of the cover, each segment including a part to extend across the tread of a tire and a part to extend along the side wall of the tire, said segments being assembled with their adjacent edges located in planes radiating from an interior point, the adjacent edges of the tread covering portions of said segments being hingedly connected together whereby said segments are permitted relative circumferential movement at their inner edges to permit said cover to assume an enlarged diameter when opened and removed from the tire.

5. A tire cover having a plurality of relatively short segments disposed substantially throughout the entire circumferential length of the cover, each segment including a part to extend across the tread of a tire and a part to extend along the side wall of the tire, said segments being assembled with their adjacent edges located in planes radiating from an interior point, interlocking flanges formed on the meeting edges of said segments, said flanges pivotally interconnecting the tread covering portions of said segments for movement relative to each other to thereby permit relative circumferential movement of the side wall covering portions of the segments whereby said cover may assume an enlarged diameter when opened and removed from the tire.

6. A tire cover having a plurality of relatively short segments disposed substantially throughout the entire circumferential length of the cover, each segment including a part to extend across the tread of a tire and a part to extend along the side wall of the tire, said segments being assembled with their adjacent edges located in planes radiating from an interior point, interlocking flanges formed on the meeting edges of said segments, said flanges pivotally interconnecting the tread covering portions of said segments for movement relative to each other to thereby permit relative circumferential movement of the said wall covering portions of the segments whereby said cover may assume an enlarged diameter when opened and removed from the tire, said interlocking flanges extending along the side wall covering the portions of said segments and having means for limiting the pivotal movement of said segments relative to each other.

7. A tire cover having a plurality of relatively short segments disposed substantially throughout the entire circumferential length of the cover, each segment including a part to extend across the tread of a tire and a part to extend along the side wall of the tire, said segments being assembled with their adjacent edges located in planes radiating from an interior point, interlocking flanges formed upon each of the segments and extending along both the tread covering portions and the side wall portions of said segments, said flanges constituting hinge means pivotally interconnecting adjacent segments for movement relative to each other about points disposed adjacent the exterior circumference of the cover and the flanges on the side wall portions of said segments loosely interlocking the adjacent edges of the segments to limit the pivotal movement of said segments relative to each other.

ELMER E. FREY.